United States Patent [19]

Schueler

[11] E Re. 30,398

[45] Reissued Sep. 9, 1980

[54] BURSTER MECHANISM

[75] Inventor: Marlin A. Schueler, Oakland, Calif.

[73] Assignee: American/Durein Company, Oakland, Calif.

[21] Appl. No.: 969,443

[22] Filed: Dec. 14, 1978

Related U.S. Patent Documents

Reissue of:

[64] Patent No.: 3,991,924
Issued: Nov. 16, 1976
Appl. No.: 596,861
Filed: Jul. 30, 1975

[51] Int. Cl.[2] ..... B26F 3/02

[52] U.S. Cl. ..... 225/100

[58] Field of Search ..... 225/100, 101, 2, 4, 225/5, 106, 94, 96

[56] References Cited

U.S. PATENT DOCUMENTS

| | | | |
|---|---|---|---|
| 1,287,923 | 12/1918 | Dutro et al. | 225/100 |
| 2,513,093 | 6/1950 | Hageman | 225/100 |
| 2,771,950 | 11/1956 | Smith | 225/100 |
| 2,778,424 | 1/1957 | Hageman et al. | 225/5 X |
| 2,862,554 | 12/1958 | Davidson et al. | 225/100 |
| 3,135,446 | 6/1964 | Sargent | 225/100 |
| 3,146,927 | 9/1964 | Peterson | 225/100 |
| 3,161,335 | 12/1964 | Pine et al. | 225/100 |
| 3,338,487 | 8/1967 | Schutz | 225/100 |
| 3,436,001 | 4/1969 | Bartleson | 225/100 |
| 3,484,031 | 12/1969 | Pine | 225/100 |
| 3,672,551 | 6/1972 | Peterson | 225/100 |
| 3,741,451 | 6/1973 | Parenti et al. | 225/100 |
| 3,856,196 | 12/1974 | Bayne et al. | 225/100 |
| 3,888,399 | 6/1975 | Hanson et al. | 225/100 X |

*Primary Examiner*—Frank T. Yost
*Attorney, Agent, or Firm*—Robert G. Slick; Bruce H. Johnsonbaugh

[57] ABSTRACT

A simplified burster mechanism for perforated forms is provided wherein the burster can be adjusted to separate forms of different sizes in a simplified manner.

5 Claims, 7 Drawing Figures

BURSTER MECHANISM

Matter enclosed in heavy brackets [ ] appears in the original patent but forms no part of this reissue specification; matter printed in italics indicates the additions made by reissue.

SUMMARY OF THE INVENTION

Business forms are frequently supplied in the form of continuous webs having perforations separating adjacent forms on the same web. It is frequently desired to separate forms from the continuous web into a number of discreet sheets.

Burster mechanisms for this purpose have been known for many years, but most of them have been relatively cumbersome. This is particularly true of bursters which can be adjusted to separate forms of varying lengths.

Burster mechanisms operate on the general principle of maintaining a web between two pairs of rollers with the forward pair traveling at a somewhat higher speed than the rear pair and with a burster bar located between the two pairs of rollers. As the paper is drawn taut between the rollers, the web is brought into contact with the burster bar at one of the perforations, causing the forms to separate.

In the past, it has been thought necessary to adjust the distance between the two sets of rollers to accomodate forms of varying lengths. Since both sets of rollers must be driven, this has required a complex mechanical arrangement to adjust the distance between the rollers while maintaining the drive to the two sets of rollers in the correct ratio.

Most burster mechanisms used in the past have also employed an endless running belt beneath the web so that as one form is separated from the web, the leading edge of the severed web is picked up on the endless belt and carried to the forward set of rollers.

In accordance with the present invention, a simplified burster mechanism is provided wherein the burster can be set for forms of varying lengths merely by adjusting the position of the burster bar. It is not necessary to change any other adjustment or the distance between the rollers.

Further in accordance with the present invention, a burster mechanism is provided wherein more than one set of perforations can be maintained between the two pairs of rollers with the web being burst only at the desired perforation line.

Another feature of the present invention is the elimination of the endless belt moving under the burster bar and the leading edge of the web is merely pushed along a flat pan member.

Still another feature of the invention is a self-centering mechanism for the paper so that any tendency of the paper to go off to one side is automatically corrected.

Another feature of the present invention is that both sets of rollers are under a hinged cover which can be quickly raised in case of a jam, to clear the mechanism.

Still another advantage of the present invention is the provision of a simplified gauge mark whereby the machine can be adjusted for different tear widths without reference to a dial or gauge.

Other features and advantages of the invention will be brought out in the balance of the specification.

DESCRIPTION OF THE PREFERRED EMBODIMENTS

Figure 1:
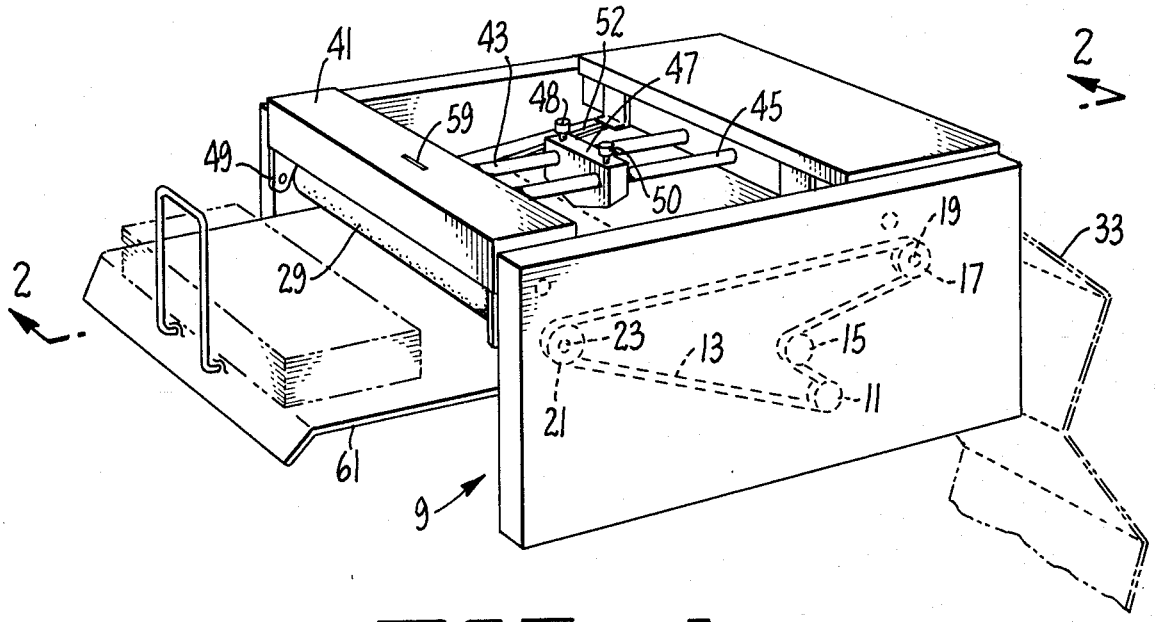
FIG. 1 is a perspective view of a burster embodying the present invention.
Figure 2:
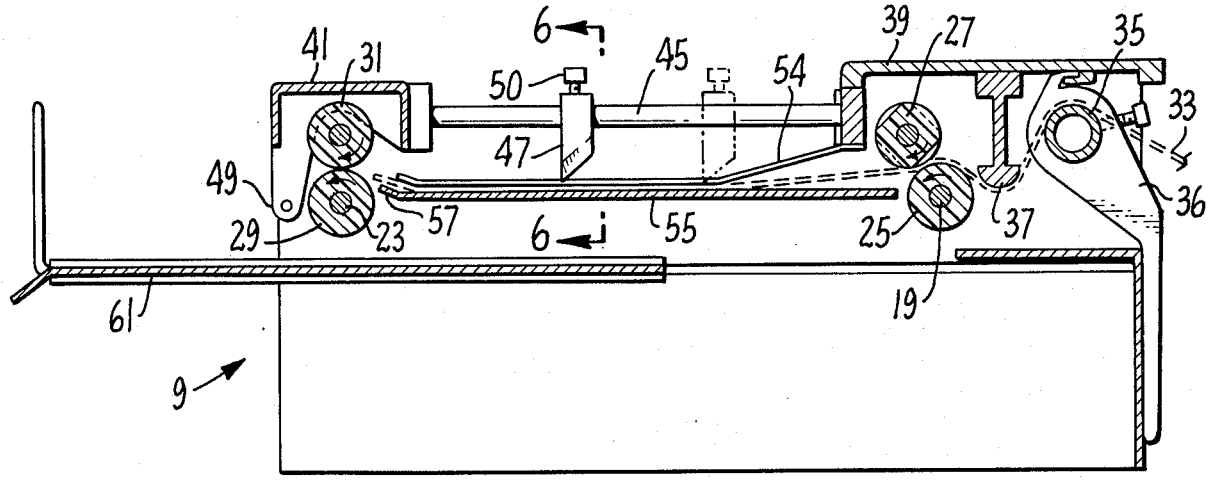
FIG. 2 is a section on the line 2—2 of FIG. 1.

Referring now to the drawings by reference characters, the burster of the present invention is mounted in a frame generally designated 9. A motor, not shown, having a drive sprocket 11, drives endless chain 13 over idler 15 which in turn drives sprocket 17 mounted on feed roller shaft 19 and sprocket 21 mounted on snap roller shaft 23. Shaft 19 carries feed roller 25 and also serves to turn the mating feed roller 27 mounted for rotation above it through gearing, not shown. The specific construction of roller 27 is later described. Shaft 23 carries snap roller 29 and drives a second snap roller 31 mounted for rotation above it through gearing, not shown. Sprocket 21 is slightly smaller than sprocket 17 so that shaft 23 is driven at a slightly higher rate of speed than shaft 19.

The web 33 to be burst is introduced over guide roller 35 and tension bar 37. Guide roller 35 carries adjustable edge guides 36. Tension bar 37 is attached to a rear cover member 39 which in turn is fastened to a front cover member 41, the cover member 39 being maintained in spaced relationship to cover member 41 by means of rods 43 and 45 which also serve to carry the burster bar which is generally designated 47. Cover 41 is hinged at 49 so that the entire cover assembly can be raised for clearing or loading the machine. When the cover assembly is raised, bar 37 is raised, relieving tension from the web, and the burster bar 47 is also raised. Thus, it requires only one simple operation to expose the rollers to load or to clear the machine in the case of a jam.

The burster bar 47 has a V-shaped blade 51 and the bar is held in place by means of set screws 48 and 50. Obviously, by loosening the screws 48 and 50 one can position the burster bar at any place upon the rods 43 and 45 and it will be held in the desired location by retightening the screws 48 and 50.

Mounted under burster bar 47 is a flat pan 55 having an upturned end 57 which terminates just short of the bite of rollers 29 and 31.

Thin flexible fingers 52 and 54 extend from the rear cover 39 over pan 55 and these have upturned terminal ends 56. These fingers prevent "tenting" and help guide the terminal end of the web into rollers 29 and 31. Mounted near the top center of cover 41 is a gauge or index mark 59 which can be merely a painted line or, preferably, an upstanding tab. Mounted on the frame of the machine is a tray 61 for receiving the burst documents.

Figure 7:
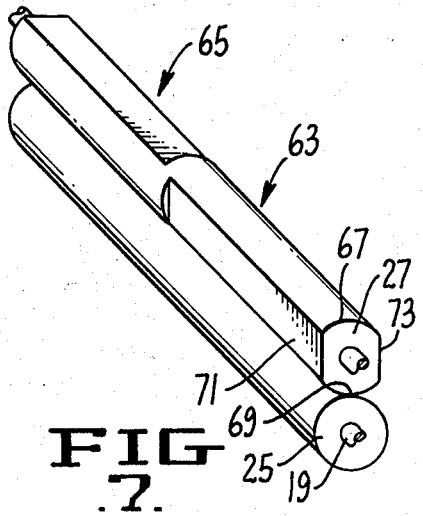
FIG. 7 is an enlarged perspective view of the drive rollers.

The construction of the feed rollers is shown in FIG. 7. The bottom roller is round as shown but the upper roller 27 has a special configuration. This roller is divided into two equal horizontal portions, namely a near side 63 and an off side 65. The near side has two round portions 67 and 69 with parallel flat portions 71 and 73 connecting the rounded portions. The rounded portions occupy a little over half of the periphery of the roller. The off side 65 is identical in construction except that the flats are offset 90° to those of the near side 63. It has been found that by constructing the rollers in this manner, they have an automatic straightening effect. If the paper tends to skew, it will be preferentially driven on the lagging side which will tend to straighten the paper in its path.

To use the machine, the burster bar 47 must be first set to the proper position. One first tears off one of the forms from the web and uses this as a gauge between the index mark 59 and the burster bar 47. Once the burster bar is in the proper position, the cover assembly is raised and the web fed between rollers 25 and 27. The cover is lowered and the machine is started, and the bursting operation will be carried on continuously from then on.

Figure 4:
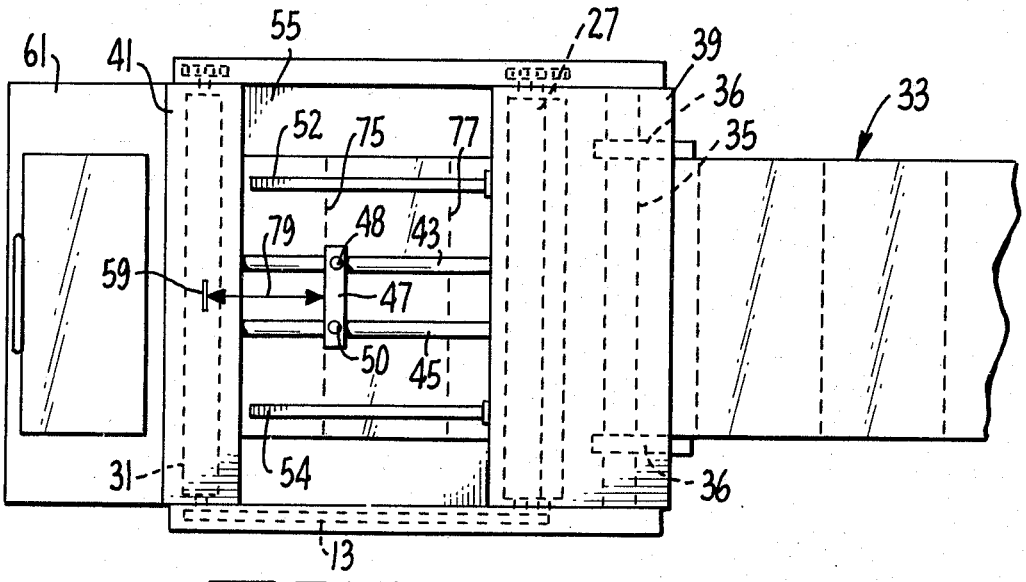
FIG. 4 is a plan view of the burster mechanism showing the machine set for bursting short forms.

In FIG. 4, the distance represented by arrow 79 represents the length of one form and, as can be seen, two rows of perforations, namely 75 and 77, appear between the feed and snap rollers. As will be later explained, it is not necessary to adjust the distance between the rollers and the initial tear will be on the line 75 and line 77 will remain intact until it in turn comes to burster bar 47.

Figure 5:
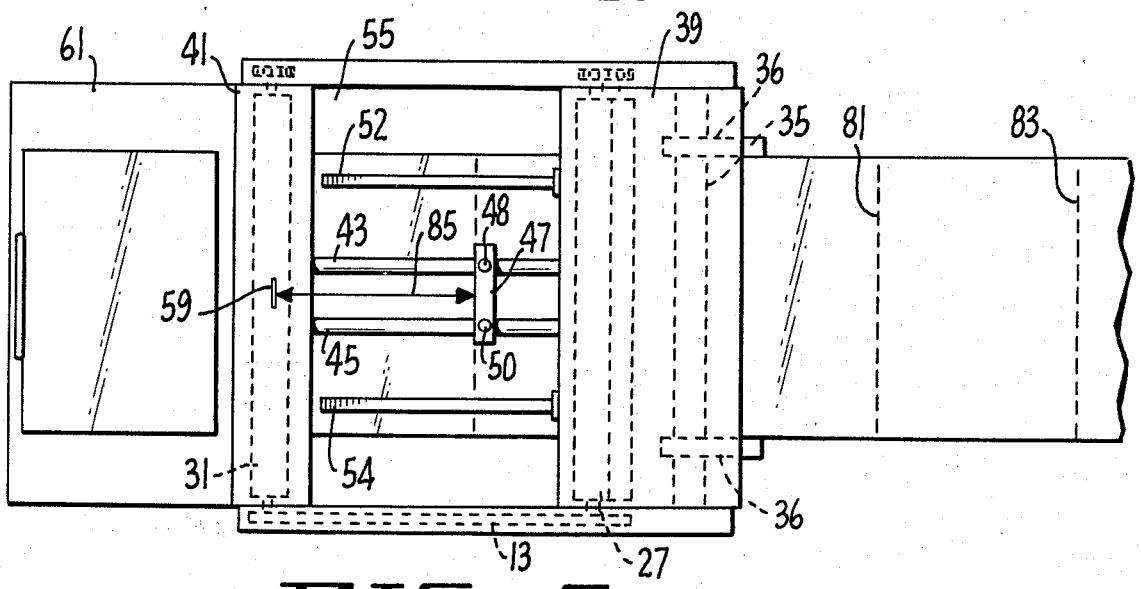
FIG. 5 is a plan view, similar to FIG. 4, but showing the machine set to burst long forms.
Figure 6:
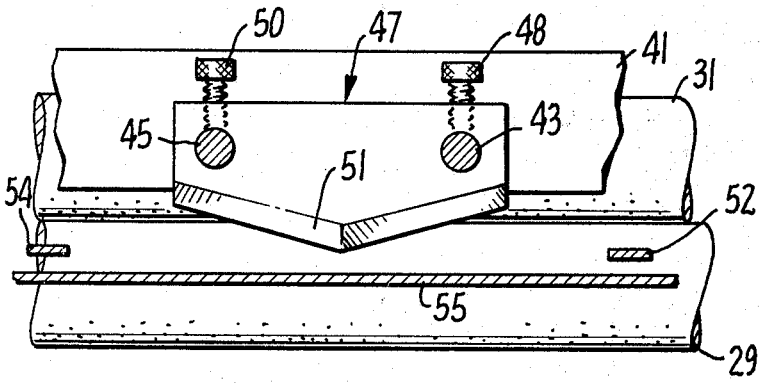
FIG. 6 is an enlarged section on the line 6—6 of FIG. 2.

In FIG. 5, it will be seen that the perforation lines 81 and 83 have a substantially greater separation than the lines of perforations of FIG. 4. Here again, one places a torn off form between the index mark 59 and burster bar 47 so that they are separated by one form length as is shown by the arrow 85. Here only a single perforation line will occur between the two sets of rollers and the tearing will be on the perforation. Thus, by the simple adjustment of the burster bar 47, one can accomodate forms of widely varying size and it is not necessary to alter the spacing of the rollers as is ordinarily necessary in prior art devices.

Figure 3:
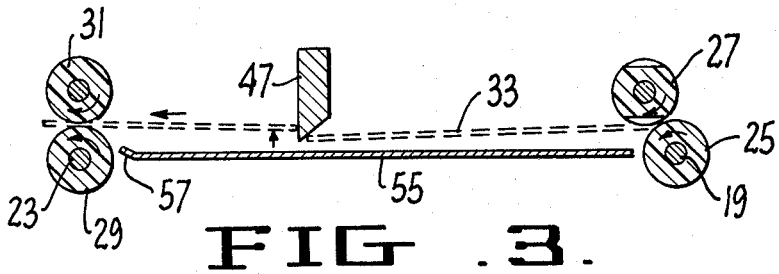
FIG. 3 is a partial section, similar to FIG. 2, illustrating the action of the burster mechanism.

The operation of the device can be clearly shown by reference to FIG. 3. Web 33 is propelled by rollers 25 and 27 and passes along flat pan 55 held down by the anti-tenting fingers 52 and 54. The web encounters the upturned end 57 of pan 55 and is engaged between rollers 29 and 31, which are moving at a slightly greater speed than the feed rollers. The paper will become taut between the two pairs of rollers as it engages the burster bar 47 at a perforation line. This will cause the leading form to separate and be propelled forward between the rollers 29 and 31 onto platform 61. The free end of the web 33 will now fall down onto the pan 55 and be held down by fingers 52 and 54 as it is pushed along by rollers 25 and 27 for a repetition of the operation at the next perforation.

Although a preferred embodiment of the present invention has been described, it will be understood that many variations can be made in the structure shown without departing from the spirit of my invention.

I claim:

1. A burster mechanism comprising in combination:

a. a pair of feed rollers located adjacent to the entrance end of a burster machine, b. a pair of snap rollers located adjacent to the discharge end of said burster machine, c. said feed rollers and said snap rollers being mounted for rotation on fixed, spaced centers, d. driving means for said rollers whereby said snap rollers are driven at a slightly higher rate of speed than said feed rollers, e. a burster bar extending parallel to and between said feed rollers and said snap rollers, and f. means whereby the *horizontal* position of said burster bar can be *slidably* adjusted to a selected position between said feed and snap rollers.

2. The structure of claim 1 wherein said burster bar is slidably mounted on rods extending between said feed rollers and said snap rollers.

3. The structure of claim 1 having a rear cover over said feed rollers and a front cover over said snap rollers, said front and rear covers being maintained in spaced relationship by a pair of parallel bars extending therebetween, said bars serving as an adjustable support means for said burster bar and hinge means on said front cover whereby said rear cover, said front cover, and said parallel bars can be raised as a unit on said hinge means.

4. The structure of claim 3 wherein said front cover has an index mark thereon, said index mark being adapted for use to determine the proper position of said burster bar.

5. The structure of claim 1 wherein one of the feed rollers is divided into two equal portions, each portion having parallel flat side members alternating with rounded members, the flat sides of one portion being offset 90° to those of the other portion.

[6. The structure of claim 1 having a fixed pan extending between said feed rollers and said snap rollers and having flexible fingers extending over the pan whereby a web can be passed between said pan and said fingers.]

* * * * *